(12) United States Patent
Griffin

(10) Patent No.: US 7,069,509 B2
(45) Date of Patent: Jun. 27, 2006

(54) USING INTROSPECTION FOR ACCESS OF CLASS RESOURCE BUNDLE INFORMATION FOR MESSAGES

(75) Inventor: Erick M. Griffin, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 623 days.

(21) Appl. No.: 10/052,579

(22) Filed: Jan. 18, 2002

(65) Prior Publication Data

US 2003/0137530 A1 Jul. 24, 2003

(51) Int. Cl.
*G06F 3/00* (2006.01)

(52) U.S. Cl. ............... 715/712; 715/713; 715/714

(58) Field of Classification Search ........... 345/712, 345/713, 783, 816, 714; 715/712, 713, 714, 715/816, 783
See application file for complete search history.

(56) References Cited

U.S. PATENT DOCUMENTS

| | | | | |
|---|---|---|---|---|
| 5,179,654 A | * | 1/1993 | Richards et al. | 345/708 |
| 5,872,973 A | | 2/1999 | Mitchell et al. | 395/685 |
| 5,986,652 A | * | 11/1999 | Medl et al. | 345/712 |
| 6,023,271 A | | 2/2000 | Quaeler-Bock et al. | 345/335 |
| 6,311,151 B1 | | 10/2001 | Yamamoto et al. | 704/8 |

OTHER PUBLICATIONS

Java 2 Platform SE v1.3.1: Class ListResourceBundle, 2001, Sun, pages: all, http://java.sun.com/j2se/1.3/docs/api/java/util/ListResourceBundle.html.* http://www.devsphere.com/mapping/docs/guide/appmodel.html, "Devsphere™Mapping Frame—Developer's Guide", pp. 9-19.

Erick Griffin, Mar. 8, 2001, Spring 2001 Software Test Automation Conference, "Capabilities of Java Test Execution Framework".

* cited by examiner

*Primary Examiner*—Raymond J. Bayerl
*Assistant Examiner*—Dennis G. Bonshock
(74) *Attorney, Agent, or Firm*—Marcia L. Doubet; Gerald R. Woods

(57) ABSTRACT

Using introspection for access to class resource bundle information for the display and update of pairs of related graphical user interface ("GUI") panels. In preferred embodiments, a Java resource bundle is provided with a first array containing pairs of key strings and corresponding text blocks and a second array containing pairs of key strings and corresponding text blocks, with the first key identifying a list entry and the second key identifying the text block corresponding to the list entry. This data structure may be used in the display of a pair of GUI panels, representing for example a list of help topics where the help text corresponds to a selected help topic. By introspecting, a mouse listener can efficiently find and display the help text corresponding to a topic selected by a mouse click; furthermore, the resource bundle can be updated without rebuilding the software accessing it.

22 Claims, 3 Drawing Sheets

USING INTROSPECTION FOR ACCESS OF CLASS RESOURCE BUNDLE INFORMATION FOR MESSAGES

BACKGROUND OF THE INVENTION

Field of the Invention

The present invention relates to computer software, and deals more particularly with methods, systems, and computer program products for using introspection for access to class resource bundle information for massages.

RESERVATION OF COPYRIGHT

A portion of the disclosure of this patent contains material to which a claim of copyright protection is made. The copyright owner has no objection to the facsmile reproduction by anyone of the patent document or the patent disclosure, as it appears in the Patent and Trademark Office patent file records, but reserves all other rights whatsoever.

DESCRIPTION OF THE RELATED ART

Much computer software today contains interfaces between the functions of computer software and the user who interacts with those functions. The software will present information to the user in the form of menus or explanatory text with which the user will interact. In the case of menus, the user will make a selection and the computer software will decode the selection and perform the indicated operation. In the case of explanatory text, the user will indicate which portion of the explanatory text the user desires to be presented, by making a selection either from a table of contents, a list, or an outline; the computer software will respond with a block of text that it has stored within the program or on disk.

It often happens that the explanatory text is volatile and changes on a periodic basis. This necessitates a change in either the selection criteria (i.e. the text comprising the selection) or the textual block, both of which may either be stored on disk or within the program. Such changes may create the need to alter the computer software used to present the text. For example, in days when storage structures were static, an increase in the size of a particular textual block could require a corresponding increase in the space allocated within the computer program to store such text, since only a fixed amount of space was allocated based upon the maximum expected size of the textual block. Such an increase would require rebuilding the executable software module to provide more storage. However, this required the executable software to be sized for the worst case and was therefore an inefficient use of available resources for storage and execution of the module.

Later as computer systems became more sophisticated, dynamic storage capabilities were developed, in which the computer software would determine the required amount of storage, based upon the size of the textual block, and then request that amount of storage from the computer system, which would then allocate an amount of space from its pool of available space. While this was an efficient management of space among numerous computer software programs having different space requirements, there were a number of problems associated with dynamic storage. First, each computer software program running under such a computer system required the development of storage management schemes for acquiring and releasing storage blocks, which in turn resulted in longer processing time required for the computer software module. This required careful attention by the programmer to ensure that memory was being properly managed. Second, such schemes were known to be prone to problems, such as "memory leaks" in which, through error by either the programmer or system timing problems, a storage block was thought to have been released but in reality was never recognized as being released by the computer system. This resulted in a gradual buildup of unreleased memory blocks that were not allocated to any executing program, and this reduced the amount of available memory for allocation by the system. The computer system gradually ground to a halt through lack of resources and frequently had to be reinitiated. Other problems consisted of erroneous computer software "stepping on" the memory of other computer software by impermissibly writing into its memory. Third, because each computer software module was required to provide its own memory management scheme consisting of requesting, releasing, and keeping track of memory allocations, the result was replication of code among many different software modules.

One solution to the problem of duplicate memory management schemes within different software programs using the same textual data was to store the data on a disk file which was commonly accessed by each software module. In this way, text could be expanded or contracted without affecting the computer software accessing it. However, the organization of the data within the disk file had to be known to the computer software which would then implement a method for accessing this dynamic data on disk. This scheme of accessing and processing dynamic disk data had the same problem mentioned previously of replication of the same or similar computer code within different computer programs, resulting in duplicated software maintenance effort on the part of the programmers and inefficient use of computer resources (in terms of software module sizes). This problem was ameliorated somewhat by the development of software libraries which, having the common computer code, would then be included in each computer software program which accessed the particular disk files; but whenever this library code changed, it necessitated the rebuilding of each computer program using the library. Furthermore, dependencies within the library had to be recognized and provided for within each computer program. Finally, a computer software program might be omitted from the rebuild process, either inadvertently or because the library change was not judged to be relevant to the computer software program; this resulted in many different software programs having many different configurations.

Another solution to the problem of duplication of memory management schemes by different software programs accessing the same textual data was to store the data within an executable service module which was then dynamically linked to the program when it was invoked at runtime. This latter solution resulted in the reduction in importance of system libraries since the routines for accessing and providing the textual data could be built into the executable service module and used by all software programs. However, the programs still had to be aware of the nature of the data and such dependencies were a part of each computer program. Each program had limits to its functionality; if the textual data within the executable service module changed too much, in terms of its content, interpretation, etc., then the using computer program would still have to be modified to accommodate such changes.

Today, the concept of object-oriented design has been implemented within the software development environment;

this approach has been described and documented in "Object-Oriented Analysis and Design with Applications", 2nd Edition, by Grady Booch, et al. (Addison Wesley Longman, Inc., 1994, ISBN 0-8053-5340-2), which is incorporated herein by reference. The intent is to isolate, or encapsulate, properties and methods associated with the object of interest so that dependencies between the particular software program functions and the functions associated with the object are minimized. A number of computer languages have been developed to implement these object-oriented design concepts, such as Ada, C++, and Java, and each language has its own strengths, capabilities, and weaknesses as to how well it reduces unwanted dependencies within programmatic structures. ("Java" is a trademark of Sun Microsystems, Inc.)

In particular, the Java computer language is both a programming language in its own right and a platform for program development. Programs written in Java are usually implemented in practice as a two stage process, in which the Java source code is compiled to create an intermediate code which is then interpreted by the Java platform implemented on the particular computer system on which the Java program is executed. This characteristic makes Java programs transportable between different computer systems. Programs written in Java can also be implemented as a completely compiled program running under, and using the services of, a particular computer system. The Java platform is comprised of the Java Virtual Machine (JVM), which serves as the system-dependent platform upon which is executed the system-independent Java program, and the Java Application Programming Interface (Java API), which provides a large set of commonly-used software components to the program. Different subsets of these components are grouped by similar function and are called libraries, or packages. For example, one subset of these components consists of the graphical user interface (GUI) containing generic objects called widgets used by the using program to interact with a user at a computer terminal. Another Java API library is called JavaBeans, which is a trademark of Sun Microsystems, Inc.

The term "reflection" describes a Java API which supports introspection of the classes and objects in the JVM. By using reflection, a program can dynamically examine an arbitrary object at run time and determine its characteristics, i.e. details about its class, interfaces it implements, its list of methods, and the fields it supports.

One particular Java API library provides a set of tools supporting internationalization of a software application, i.e. simplifying the application's adaptation to various languages and regions without software changes. This package is called "java.util" and it includes the following three classes (within the meaning of object-oriented terminology): Locale, TimeZone, and ResourceBundle. The abstract class ResourceBundle has two subclasses: PropertyResourceBundle and ListResourceBundle. A PropertyResourceBundle is backed by a properties file, a plain-text file that contains translatable text. Properties files are not part of the Java source code, and they can contain values for String objects only. The ListResourceBundle is backed by a class file for encapsulating locale-specific objects. ResourceBundle objects contain an array of key-value pairs for values which have meaning for a locale specified in a Locale object. To retrieve a value from the ResourceBundle, the corresponding key, which must be defined as a String type, must be presented to the ResourceBundle; the value is the locale-specific object, usually a String type also.

The problem addressed by internationalization is that of dynamically supplying special objects which are pertinent to the locale in which the program is being run, without changing the source code. However, the structures used to specifically address internationalization can also be used to address other, more common problems. One such problem is being able to supply a split pane help panel, where a list of topics is displayed in the left panel and corresponding help text for a selected subject or topic is displayed in the right panel. An internal data structure within the program component must be maintained to keep the left and right panels in synchronization; this data structure normally takes the form of an array or vector. Such an internal data structure and the source code which supports it must be maintained as part of normal software maintenance procedures; this increases the cost of software maintenance and the opportunities for introducing errors during normal software maintenance activities. Furthermore, every time such code is changed, the possibility is introduced that an unwanted dependency is created which will provide hidden sources of error.

Accordingly, what is needed is an improved technique for accessing textual data information and maintaining it in an efficient, rapid manner without creating unwanted dependencies between the content, organization, mode of access of such data and the requesting program.

SUMMARY OF THE INVENTION

An object of the present invention is to provide an improved technique to allow a program to access data without creating unwanted dependencies between the content, organization, mode of access of such data and the requesting program.

Another object of the present invention is to provide a technique which is not dependent upon the search methodology used to locate the data.

Yet another object of the present invention is to provide a technique which provides textual data corresponding to a key without being dependent upon the storage organization of the textual data.

Still another object of the present invention is to provide a technique which provides textual data corresponding to a key without being dependent upon the storage organization of the key.

Yet another object of the present invention is to provide a technique which requires only the name of the object containing the required methods and required data, in order to use the object through introspection.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for allowing a program to access a particular data structure without creating unwanted dependencies between the requesting program and the content, organization, and mode of access of such data. The data to which the invention applies comprise a first set of objects each having an associated first key, a second set of objects each having an associated second key, and a one-to-one relationship between a first key associated with a first object and a second key associated with a second object. The data and their associated methods are encapsulated in a Java ListResourceBundle, and the characteristics of the data contained in the ListResourceBundle are ascertained by reflection/introspection of the data contained therein. In this way, dependencies between the data and the using program are eliminated. In particular, the use of a ListResourceBundle requires that the keys be cast as textual strings. The ListResourceBundle contains two items—the standard non-extendable two dimensional array structure normally found in a resource bundle and containing pairs of keys and corresponding values, and a special public two dimensional array structure containing key pairs of associated keys.

The special two dimensional array of key pairs mirrors a GUI presentation of two panels which are available for display of objects. It establishes a one-to-one relationship between an object taken from a first set of objects and an object taken from a second set of objects. A first panel displays a first set of objects, each identified by the first key of a selected key pair, and a second panel displays the corresponding object taken from a second set of objects and identified by the second key in the key pair. When an object is selected from the first panel, its corresponding object is found through the special two dimensional array and displayed in the second panel. The invention enables the sets of objects to be modified without corresponding modification of programmatic code; it also enables the dual panel protocol described above to be efficiently implemented. (Note that while the examples and discussions herein are primarily in terms of the first and second panels containing textual data, this is for purposes of illustration and not of limitation. Alternative types of information, such as representations of graphical icons, might be stored as values in the two dimensional array and presented on either or both sides of the display.)

The present invention will now be described with reference to the following drawings, in which like reference numbers denote the same element throughout.

DESCRIPTION OF PREFERRED EMBODIMENTS

The present invention defines techniques for allowing a program, without creating unwanted dependencies, to access data of a type comprising a first set of objects each having an associated first key, a second set of objects each having an associated second key, and a one-to-one relationship between a first key and a second key, the keys associated with an object taken from the first set and an object taken from the second set, respectively. The first set of objects is preferably organized as a list (or similar structure) having an order imposed upon its components; in programming terms, this is commonly called an index. An example of such a list might be a table of contents of a manuscript in which each first object is a textual string representing a section heading. Each such topic would have a one-to-one logical relationship to explanatory text which defines, describes, explains, or otherwise provides more information pertaining to the section heading. This explanatory text may be of any length, but as a unit will have a logical relationship with the section heading. If each section heading and each explanatory text block is associated with a unique key, then the relationship between the topic and its associated explanatory text block can be defined by a relationship between the two keys. Another example of such a list might be a list of help topics in which the first object is a textual string representing a particular topic and the second object is a block of explanatory text elaborating upon the particular topic.

To illustrate the inventive concept in a more concrete manner, it is instructive to examine an environment in which the invention has been advantageously employed. Such an environment is given by an internally-deployed tool referred to as the Test Case Result (TCR) Manager Tool, as will be described herein. TCR is part of an integrated test environment developed to support automated regression testing of previously developed and/or modified software to ensure consistent performance. A system user such as a test engineer uses the TCR application to query a database where data is stored, e.g. test case statistics or raw data being generated by a test harness. As part of the TCR, a Help capability (TCRManagerHelp) is provided to supply the user with assistance for a selected set of topics through display on a computer terminal of a split pane help window. This display is made through a standard GUI associated with Windows operating system. ("Windows" is a trademark of Microsoft Corporation.) Associated with each topic is a detailed explanation of the issues related to the topic, and the user is given the capability of searching through the available topics as by scrolling, selecting a topic through use of a mouse click, and then observing the associated detailed explanation of the topic.

Figure 1:
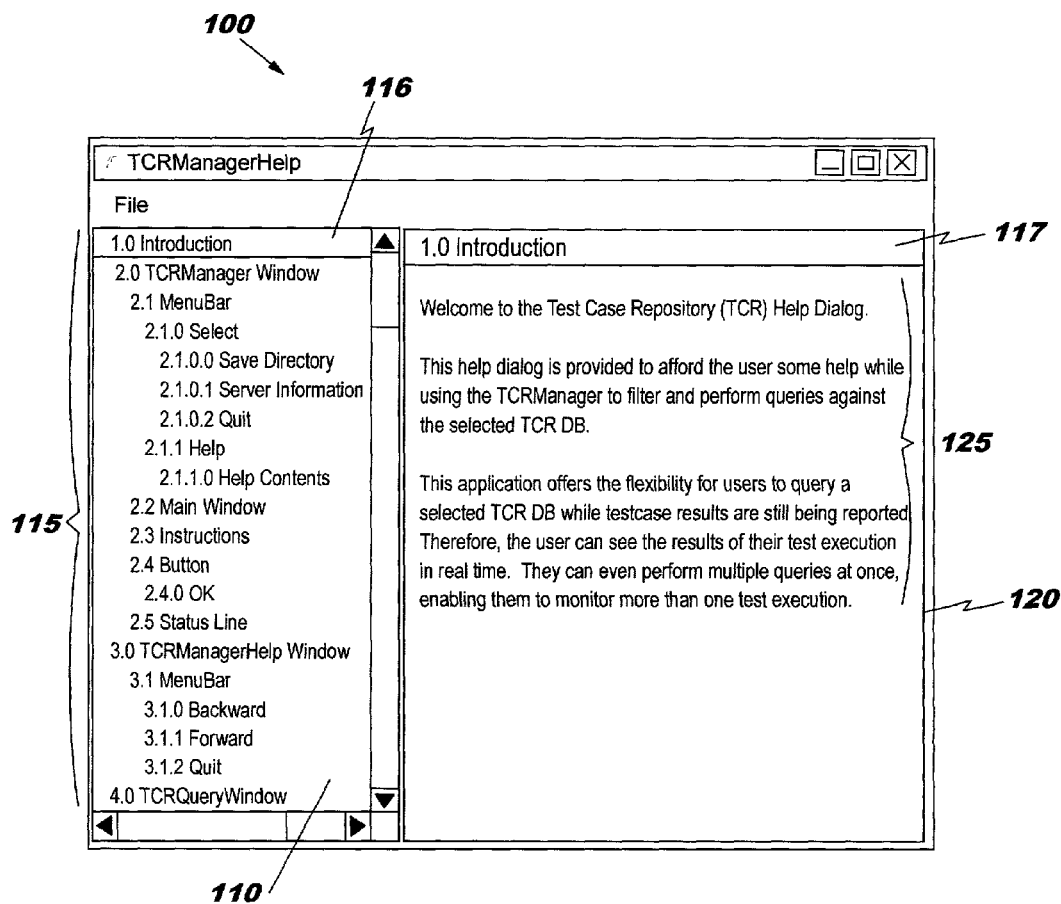
FIG. 1 is an example of a GUI split pane window having two panels, as seen by a user of a program which has been instrumented according to the invention.

Referring now to FIG. 1, a graphical user interface (GUI) is shown illustrating an initial Help screen in which the invention may be used to produce a graphical display. A window 100 contains two panels. Left panel 110 is used to display a list portion 115 of a list of textual objects. In the example shown, the list is a table of contents where each textual object is a topic. Other list structures such as indented outlines, numbered lists, etc., might equally well be shown without departing from the scope of the invention. Such lists may also be either ordered or unordered. A particular list object 116 has been selected, which in an actual GUI display would typically be indicated by a highlighted area of the list. Right panel 120 is used to display explanatory text 125, where the semantic content of text 125 corresponds to and elaborates on the selected list object 116. A header area 117 in the right panel 120 contains a copy of the selected list object 116 and provides confirmation of the selection.

Figure 2:
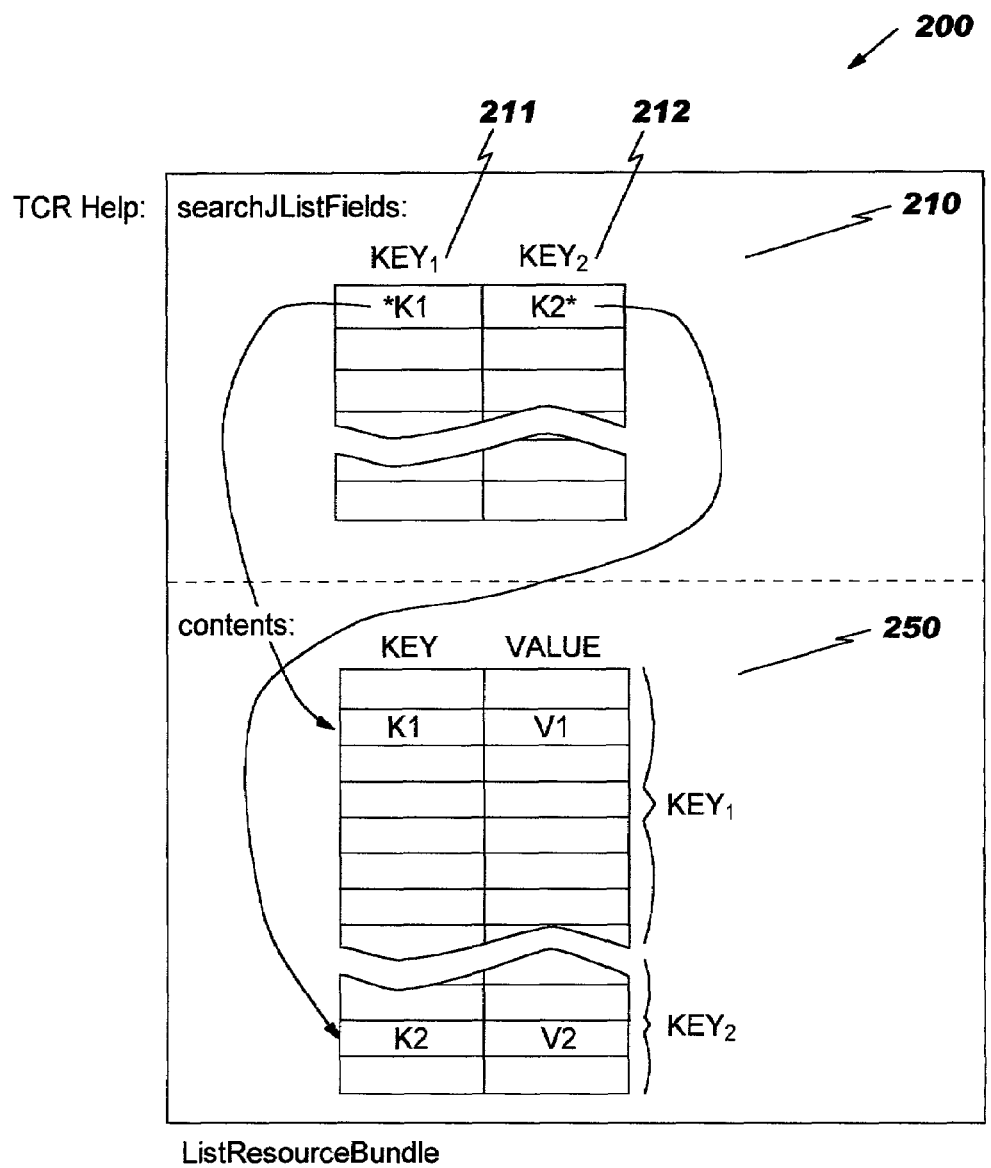
FIG. 2 provides a diagram showing the internal data structure of an instantiation of a ListResourceBundle which has been structured according to the invention.

The display shown in FIG. 1 is presented and maintained by a computer program, which in preferred embodiments is a program written in Java and employing several Java API packages, such as the Java Swing API or the Java AWT API, both for GUI displays. Another Java package for internationalization defines the ListResourceBundle class from which a resource bundle object has been instantiated which implements the principles of the invention. Referring now to FIG. 2, a resource bundle called TCRHelp is illustrated, which is an extension of the standard Java ListResourceBundle class. In a preferred embodiment of the invention, this resource bundle contains two static string arrays. The first string array, searchJListFields 210, is a public 2×n array with each entry containing two corresponding keys, a first key field 211 containing keys indexing search (or topic) text strings arid a second key field 212 indexing help text blocks. In preferred embodiments, both keys are text strings within the meaning of Java (although other types of key values, such as integers, might be used alternatively). Both the search text string and the help text string are contained in a second array, contents 250, which is also a static encapsulated 2×n array. Each entry of the contents array 250 contains a key and either the corresponding help text information or the search/topic text, and both the key and help or the corresponding search text arc implemented as text strings. Every key entry contained in the contents array 250 corresponds to an entry in the searchJListFields array 210, and the searchJListFields array 210 is used to map the search elements to the actual message text elements. (As stated earlier, entries in the contents array are described herein as containing text, although this is simply for purposes of illustration. Other types of array values are within the scope of the present invention.

In the example shown in FIG. 1, the topic string V1 having a value of "1.0 Introduction" (corresponding to selected list object 116 of FIG. 1) may have a key K1 having a value of "tcrmanagerhelp_searchtext10". The text block V2 having a value of "Welcome to the Test Case . . . than one test execution." (i.e. the corresponding help text shown at 125 of FIG. 1) may have a key K2 having a value of "tcrmanagerhelp_helptext10". This illustrates the fact that the keys K1 and K2 are arbitrary and unique and have structures which are meaningful only to the program developer, whereas text strings V1 and V2 are representative of objects to be displayed on the computer terminal. It should be noted that this use of the resource bundle does not demonstrate concepts of internationalization.

It should be appreciated by those skilled in the art of software programming that the structure of the searchJListFields array 210 and contents array 250 may be one of any number of other data structures used to relate two sets of objects besides two dimensional arrays, e.g. linked lists, hash lists, binary lists, binary trees, and other such structures well known to the art. Furthermore, the search method for traversing the structures and locating help information corresponding to a key may vary; such search methods as a binary search, linear search, random search, and the like could be used without departing from the scope of the invention. The use of the resource bundle in this manner isolates from the calling module the data, the data structure, and the search methods used to retrieve the data. Finally, the technique of the invention may also be applied to similar Java Swing components, such as JTree, without departing from the scope of the invention.

Figure 3:
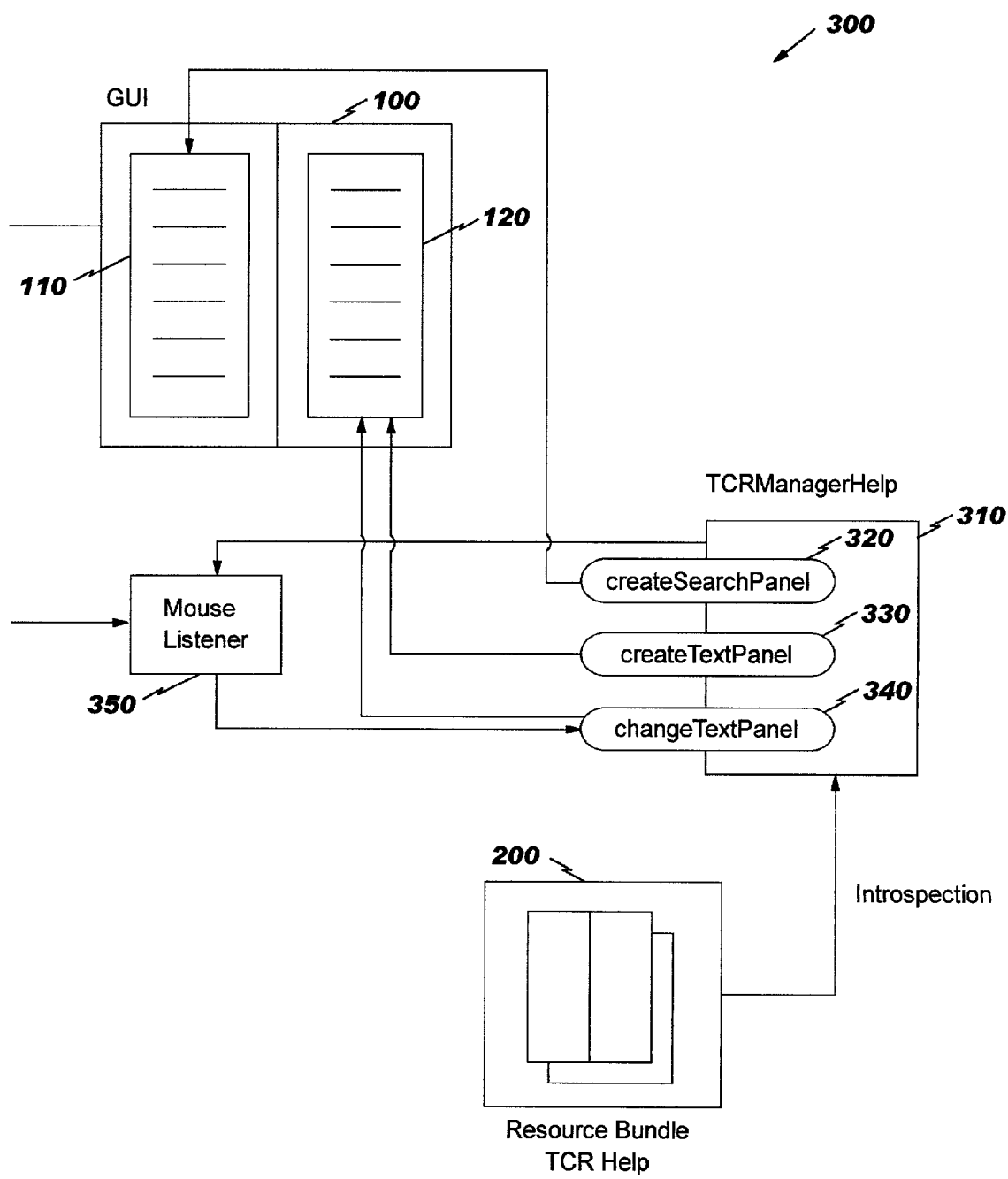
FIG. 3 provides a relationship chart for a particular embodiment of the invention, giving the relationships between various Java methods employed to maintain a GUI screen.

Referring now to FIG. 3, an embodiment 300 of a particular set of functions as implemented in Java code is given to illustrate the implementation of a help capability referred to herein as TCRManagerHelp. According to this implementation, two methods (or routines) are provided to create the GUI screen shown in FIG. 1, namely a SplitPane code for initializing and generating the pane shown in FIG. 1 and Resource Bundle code for providing the content of the split pane. Once the split pane window is initialized, then TCRManagerHelp becomes dormant until it is instructed to shut down the screen display and terminate. It is assumed that TCRManagerHelp is invoked from a user screen selection which causes TCRManagerHelp to be activated; this code is not necessary for understanding the invention and is not given here.

When the user selects a Help command from other graphical displays (not shown), the TCRManagerHelp code 310 is invoked to create an initial Help screen 100. This screen or window 100 is built up by creating the left panel 110 by calling the method createSearchPanel( ) 320 and then by creating the right panel 120 by calling the method createTextPanel( ) 330. The TCRManagerHelp code 310 then returns. Subsequent actions such as changeTextPanel( ) 340 are preferably invoked by mouse listener 350.

The createSearchPanel( ) method 320 preferably gets the resource bundle class name; introspects the public searchJListFields array; creates a JList pane in a scrolled panel, based on the initial array elements; and adds a mouse listener for mouse click events. Code which may be used to implement the createSearchPanel( ) method 320 is shown in Appendix A. Pertinent parts of this code are also given below, showing use of introspection to obtain the content of the searchJListFields array 210 in the resource bundle:

Class alt_rb=rb.getClass( );
Field  stringArrayField=alt_rb.getField("searchJListFields");
searchJListFields=(String[ ] [ ]) stringArrayField.get(alt_rb);

The name of the resource bundle class and a reference to the actual class is obtained through a call to the getClass( ) method for resource bundles rb. The string array field for class reference $alt_{13}$ rb is obtained by using the getField( ) method. Once the field is obtained, the actual object of this field can be obtained using the get( ) method. When all this is completed, the local searchJListFields contains a reflected copy of the two dimensional array of values that are in the public resource bundle field.

The createTextPanel( ) method 330 preferably creates a text area for the subject header, and then creates a text area for the help body. Code which may be used to implement the createTextPanel( ) method 330 is shown in Appendix B.

The changeTextPanel method 340 is provided to make a change in the contents of second panel 120 based upon a selection in the first panel 110, and is called by the mouse listener 350. (Mouse listener 350 preferably operates by obtaining the index of the selected item; calling the changeTextPanel( ) method; recording the user action; and then repainting the window.) The method changeTextPanel( ) 340 preferably uses the index obtained by the mouse listener to replace the header (illustrated at 117 of FIG. 1), using the newly-selected field index and the introspected first item of the searchJListFields array, and then replaces the body of the text (illustrated at 125 of FIG. 1). Code which may be used to implement the changeTextPanel( ) method 340 is shown in Appendix C. Pertinent segments of this code will now be described in more detail.

The two dimensional array searchJListFields is used to map the search elements to the actual message text elements. When the user makes a selection of a search element, i.e. key text string, within the left panel of the GUI interface, the two-dimensional array searchJListFields is used to retrieve the corresponding help text element for the right panel. Selected items are identified by an index into the object that is being used for the search. In the code provided, a Java JList is used, however any similar search object would suffice, such as, for example, a Java JTree search object. The new header value is obtained by the following line of code, based upon that index value:

String  rb_tmp_str=rb.getString(searchJListFields[item_index][0]);

According to this Java code segment, a temporary string identified by rb_tmp_str is set with the value obtained by using a getString( ) method which is genetic to resource bundles. The header area TextField is then modified according to the following line of code:

hdr_area.replaceRange (rb_tmp_str, 0, str_len);

According to this Java code segment, a generic resource bundle method replaceRange( ) is used to change the entire range of the header with the new header string. Similarly, the TextField for the help text message is changed using the same replaceRange( ) method, only using the second part of the array element currently indexed, according to the following code:

tmp=area.getText( );
str_len=tmp.length( );
area.replaceRange (rb.getString (searchJListFields[item_index][1], 0, str_len);

Referring again to the screen display shown in FIG. 1, when the mouse is clicked by a user to select a line in the first panel, the topic entry for the selection, the help message text, and header are automatically returned through the use of the introspected resource bundle array searchJListFields that had been obtained earlier. This array maps each search subject heading with its corresponding help message text. There are no individual getString( ) resource bundle message calls in the supporting code. Therefore, when the help capability implemented in the resource bundle is modified by adding new message headers and help text blocks therein, e.g. to add additional explanations, include additional topics, clarify existing help topics, provide internationalization, etc., then only the resource bundle is affected; no new code must be written or modified in order to accommodate the modified help capability. The code contained within the existing TCRManagerHelp class will dynamically pick up those changes after the resource bundle is rebuilt.

Appendix D provides sample code which may be used for handling user actions.

Appendix E provides sample resource bundle data that may be used to provide help text as illustrated with reference to the example in FIG. 1. (It should be noted that the present invention is not limited to use in providing help text.)

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

As has been demonstrated, the present invention provides advantageous techniques for allowing update of a textual object, such as a help dialog, without concurrent update of the calling program's code and for providing information about the textual object by default through introspection. By using few routines and introspection, most of the mapping that is needed to associate the help index with its text and header can be done through introspection. This is accomplished by defining a special mapping array within the resource bundle class and using introspection to load the appropriate help topic and text, as described above.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include both the preferred embodiment and all such variations and modifications as fall within the spirit and scope of the invention.

APPENDIX A

```
/**
 * The <em>createSearchPanel</em> method creates a search
 * panel.
 * <p>
 * @return void
 * (c) Copyright 2002 International Business Machines
 *      Corporation
 */
private void createSearchPanel() {

//
    // Create a model to hold our entries.
    //
    DefaultListModel model = new DefaultListModel();

//
    // Add elements to model from resource bundle.
    // We can do this by using reflection/introspection to get
    // the searchJListFields content in the
    // resource bundle and then populate our model from that.
    //
    try {
        Class alt_rb = rb.getClass();
        Field stringArrayField = alt_rb.getField(
"searchJListFields" );
        searchJListFields = (String[][])stringArrayField.get(
alt_rb );
    } catch ( NoSuchFieldException nsfe ) {
    } catch ( IllegalAccessException iae ) {
    } // endtry //
    // Got field array via reflection, find its length.
    //
    int jlistmax = searchJListFields.length;
    for ( int ii = 0; ii < jlistmax; ii++ ) {
        model.addElement( rb.getString(
searchJListFields[ii][0] ) );
    } // endfor searchList = new JList( model );
    searchList.setName( "TCRManagerHelpSearchJList" );
    searchList.setLayout( new BorderLayout() );

// Do not allow users to select more than one item
    // in list at a time.
```

```
                searchList.setSelectionMode(
        ListSelectionModel.SINGLE_SELECTION );

searchList.setSelectedIndex( startMessageIndex );
                    // set initial selection to intro
                searchList.ensureIndexIsVisible( startMessageIndex );
                    // make sure it's visible //
                // Keep track of current help selection so we can
                // use the forward and backward pulldown menuitems.
                //
                windowTrail.add( new java.lang.Integer( startMessageIndex
        ) );    // first item is position 0 listPane = new JScrollPane( );
                listPane.setPreferredSize( new Dimension( 200, 400 ) );
                listPane.setMinimumSize( new Dimension( 200, 100 ) );
                listPane.setHorizontalScrollBarPolicy(
        JScrollPane.HORIZONTAL_SCROLLBAR_AS_NEEDED );
                listPane.setVerticalScrollBarPolicy(
        JScrollPane.VERTICAL_SCROLLBAR_AS_NEEDED );
                listPane.getViewport().add( searchList );
                listPane.setName( "TCRManagerHelpListJScrollPane" );

// Position selected item at top of viewport
                // in scrollpane.
                Rectangle rc = searchList.getCellBounds(
        startMessageIndex, startMessageIndex );
                listPane.getViewport().scrollRectToVisible( rc );

// This inner class detect users select one of
                // product name in list then enabled OKButton
                // so that users can take next action.
                searchList.addMouseListener( new MouseAdapter() { public void mouseClicked( MouseEvent e ) {
                        if ( e.getClickCount() == 1 ) {

Object tmp = searchList.getSelectedValue();
                            int jj = searchList.getSelectedIndex();

changeTextPanel( jj );
                            tcrHelp.repaint();    // Have to repaint the area.

//
                            // Keep track of current help selection so we
                            // can use the forward
```

```
               // and backward pulldown menuitems.
               //
                  windowTrail.insertElementAt( new
            java.lang.Integer( jj ), ++windowTrailPosition ); // item's
                                                              // position } // endif
         }                                         }); // end of
                                                   //addMouseListener } // end method
```

APPENDIX B

```
    /**
     * The <em>createTextPanel</em> method creates a text panel.
     * <p>
     * @return void
     * (c) Copyright 2002 International Business Machines
     *     Corporation
     */
    private void createTextPanel() {
        //
        // Header area.
        //
        searchPanel = new JPanel();
        searchPanel.setLayout( new BorderLayout() );
        searchPanel.setPreferredSize( new Dimension( 500, 300 ) );
        searchPanel.setMinimumSize( new Dimension( 100, 50 ) );
        searchPanel.setName( "TCRManagerHelpTextJPanel" );

hdr_area = new JTextArea();

Color clr = new Color( 255, 255, 0 );

hdr_area.setLayout( new BorderLayout() );
        hdr_area.setPreferredSize( new Dimension( 30, 20 ) );
        hdr_area.setMinimumSize( new Dimension( 10, 50 ) );
        hdr_area.setEditable( false );
        hdr_area.setBackground( clr );
        hdr_area.setName( "TCRManagerHelpHeaderAreaJTextArea" );

String sys = System.getProperty( "os.arch" );

Font fnt = new Font( "SansSerif",
    java.awt.Font.BOLD|java.awt.Font.ITALIC, 18 );

hdr_area.setFont( fnt );

// This makes sure the text is scrolled to the
        // top of the pane.
        hdr_area.setCaretPosition( 0 );

// Add the header to the north.
        searchPanel.add( "North", hdr_area );

//
        // Contents area.
        // Do NOT set minimum size or desire size since
```

```
        // we are putting this object inside a scrollpane.
        // Set it there if you want.  Just make the text
        // unmodifiable here.
        //
        area     = new JTextArea();

area.setEditable( false );
        area.setLayout( new BorderLayout() );

// Establish foreground color for help text.
        clr = new Color( 0, 0, 200 );
        area.setForeground( clr );
        area.setName( "TCRManagerHelpAreaJTextArea" );

// Set initial help content
        Font fnt1 = new Font( "Serif", java.awt.Font.BOLD, 14 );
        area.setFont( fnt1 );

changeTextPanel( startMessageIndex );

// This makes sure the text is scrolled to the top
        // of the pane.
        area.setCaretPosition( 0 );

// Create a scroll pane and add it to the center
        // of the window.
        textPane = new JScrollPane( );
        textPane.setHorizontalScrollBarPolicy(
JScrollPane.HORIZONTAL_SCROLLBAR_AS_NEEDED );
        textPane.setVerticalScrollBarPolicy(
JScrollPane.VERTICAL_SCROLLBAR_AS_NEEDED );
        textPane.setViewportView( area );
        textPane.setName( "TCRManagerHelpTextPaneJScrollPane" );
        searchPanel.add( "Center", textPane );

} // end method
```

APPENDIX C

```
/**
 * The method <em>changeTextPanel</em> is invoked via
 * a response from a mouse click on the JList for the Help
 * Dialog.  This method figures out what entry was clicked
 * on and provides the essential text for the JTextArea
 * for the user.
 * <p>
 * @param
 * <p>
 * @return void
 * (c) Copyright 2002 International Business Machines
 *     Corporation
 */
private void changeTextPanel( int item_index ) {

Color clr = null;
    String tmp = null;
    int str_len = 0;

try {
        //
        // In order to change the text field, we must first
        // get the header associated with the item selected
        // by the mouse click, given by the
        // index provided on the call.
        //
        tmp = hdr_area.getText();
        str_len = tmp.length();
        String rb_tmp_str = rb.getString(
searchJListFields[item_index][0] );

//
        // For the text area header, we then need to
        // strip off any preceding blanks.
        //
        int ii=0;
        while( (rb_tmp_str.startsWith( " ", ii )) &&
               (ii < rb_tmp_str.length()) ) {
            ii++;
        } // endwhile
        rb_tmp_str = rb_tmp_str.substring( ii,
rb_tmp_str.length() );

//
        // We use substring to remove those blanks
```

```
            // once we know how many there are.
            //
            hdr_area.replaceRange( rb_tmp_str,
                                   0,
                                   str_len );

//
            // We now get the get the text of the current text
            // message to get its length, and then replace it
            // with the requested help selection.
            //
            tmp = area.getText();
            str_len = tmp.length();
            area.replaceRange( rb.getString(
      searchJListFields[item_index][1] ),
                                 0,
                                 str_len );

//
            // This makes sure the text is scrolled to the
            // top of the pane.
            //
            area.setCaretPosition( 0 );

//
            // Ensure foreground color for this help text.  Since
            // we could have had red error text up before...!
            //
            clr = new Color( 0, 0, 200 );
            area.setForeground( clr );

} catch ( IllegalArgumentException iae ) {
        } catch ( MissingResourceException mre ) {

//
            // Establish foreground color for ERROR text.
            //
            clr = new Color( 222, 0, 0 );                           // RED
            area.setForeground( clr );
            tmp = area.getText();
            str_len = tmp.length();
            area.replaceRange( rb.getString(
      "tcrmanagerhelp_rberror" ) + mre.toString(),
                                 0,
                                 str_len );
        } // entry } // end method
```

APPENDIX D

```
/**
 * Detect users actions. Only one OKButton can do 2
 * different tasks:
 * First click to initialize product list, then OKButton grey
 * out and if users hightlight a product name from list.
 * OKButton will be enabled to allow users to do second click
 * on OK again to query the TCR DB for test results for
 * that product
 * <p>
 * @param ActionEvent  an event
 * <p>
 * @return void
 * (c) Copyright 2002 International Business Machines
 *       Corporation
 */
public synchronized void actionPerformed( ActionEvent event )
{

//
    // If the event was a pick of Quit from the pulldown,
    // then close window
    //
     if ( event.getSource() == menuQuit ) {
        setVisible(false);
        System.gc();
        return;

//
    // Else, if the item selected was Backward, then try to
    // go backward from current position in vector.
    //
     } else if ( event.getSource() == menuBackward ) {

//
        // The user wants to go backwards, get previous items
        // index from vector.
        //
        try {
           int ii = 0;
           if ( windowTrailPosition == 0 ) {
              ii = ((Integer)windowTrail.get(
windowTrailPosition )).intValue();    // item's position - 1
           } else {
              ii = ((Integer)windowTrail.get( --
windowTrailPosition )).intValue();    // item's position - 1
           } // endif
```

RSW920010149US1

```
            //
            // Change the selected index for the search list
            // and text panel.
            //
              searchList.setSelectedIndex( ii );   // set initial
                                                  // selection to intro
            changeTextPanel( ii );
            tcrHelp.repaint();         // Have to repaint the area.

} catch ( IndexOutOfBoundsException ioobe ) {
          } // endtry

//
        // Else, if the item selected was Forward, then try to
        // go forward from current position in vector.
        //
        } else if ( event.getSource() == menuForward ) {

//
            // The user wants to go backwards, get previous items
            // index from vector.
            //
             int ii=0;

//
            // If we are already at the end of the Vector,
            // then don't change index.
            //
              if ( windowTrailPosition == windowTrail.size() ) {
                  ii = ((Integer)windowTrail.get( windowTrailPosition-1
      )).intValue();    // item's position + 1

//
            // If we are already at the end of the Vector,
            // then don't change index.
            //
              } else if ( (windowTrailPosition+1) >=
      windowTrail.size() ) {
                  ii = ((Integer)windowTrail.get( windowTrailPosition
      )).intValue();    // item's position + 1

//
            // Else, go to next position and get its index value.
            //
              } else {
                 windowTrailPosition++;   // set to current index
                                          // position of current item.
```

```
            ii = ((Integer)windowTrail.get( windowTrailPosition
)).intValue();     // item's position + 1
        } // endif searchList.setSelectedIndex( ii );   // set initial
                                             // selection to intro
        changeTextPanel( ii );
        tcrHelp.repaint();         // Have to repaint the area.

//
    // OK, then quit about.
    //
    } else if( event.getSource() == OKButton ) { setVisible( false );
//      dispose();
        System.gc();
        return;
    } // endif } // end method
```

APPENDIX E

```
package com.tivoli.tcrManager.Resources;

import java.util.ListResourceBundle;

/*******************************************************************
 *
 * <dt><b>Description:</b><dd>
 * Translatable strings for Test Case Repository TCR.
 * <p>
 * @author Erick Griffin
 * (c) Copyright 2002 International Business Machines Corporation
 *
 *******************************************************************/
public class TCRHelp extends ListResourceBundle {

//
    // Current (partially-illustrated) list of supported JList Search entries for HELP Panel.
    //!!!!!!!!!!!!!!!!!!!!!!!!!!!!!!!!!!!!!!!!!!!!!!!!!!!!!!!!!!!!!!!
    // IMPORTANT NOTE:
    //        When updating the resource bundle below with new search
    //        strings for help texts, then this table has to be updated
    //        too.  This way the method that updates the fields
    //        in the JList will automatically pull the new entry names
    //        and populate them without you making any code changes..!
    //
    //        The SEARCH TEXT if for the JList on the left of the HELP
    //        dialog.  The HELP TEXT is for the JTextArea to the right
    //        of the HELP dialog.  (See TCRManagerHelp.java)
    //
    //!!!!!!!!!!!!!!!!!!!!!!!!!!!!!!!!!!!!!!!!!!!!!!!!!!!!!!!!!!!!!!!
    public static String[][] searchJListFields = new String[][] {
        // Field Description:
        //
        //   the SEARCH TEXT              the HELP TEXT
        // ---------------------------    ---------------------------
        { "tcrmanagerhelp_searchtext10",  "tcrmanagerhelp_helptext10" }, { "tcrmanagerhelp_searchtext20",  "tcrmanagerhelp_helptext20" },
        { "tcrmanagerhelp_searchtext21",  "tcrmanagerhelp_helptext21" },
        { "tcrmanagerhelp_searchtext210", "tcrmanagerhelp_helptext210" },
        { "tcrmanagerhelp_searchtext2100","tcrmanagerhelp_helptext2100" },
        { "tcrmanagerhelp_searchtext2101","tcrmanagerhelp_helptext2101" },
        { "tcrmanagerhelp_searchtext2102","tcrmanagerhelp_helptext2102" },
        { "tcrmanagerhelp_searchtext211", "tcrmanagerhelp_helptext211" },
        { "tcrmanagerhelp_searchtext2110","tcrmanagerhelp_helptext2110" },
        { "tcrmanagerhelp_searchtext22",  "tcrmanagerhelp_helptext22" },
        { "tcrmanagerhelp_searchtext23",  "tcrmanagerhelp_helptext23" },
        { "tcrmanagerhelp_searchtext24",  "tcrmanagerhelp_helptext24" },
        { "tcrmanagerhelp_searchtext240", "tcrmanagerhelp_helptext240" },
        { "tcrmanagerhelp_searchtext25",  "tcrmanagerhelp_helptext25" }, { "tcrmanagerhelp_searchtext30",  "tcrmanagerhelp_helptext30" },
        { "tcrmanagerhelp_searchtext31",  "tcrmanagerhelp_helptext31" },
        { "tcrmanagerhelp_searchtext310", "tcrmanagerhelp_helptext310" },
        { "tcrmanagerhelp_searchtext311", "tcrmanagerhelp_helptext311" },
        { "tcrmanagerhelp_searchtext312", "tcrmanagerhelp_helptext312" }, { "tcrmanagerhelp_searchtext40",  "tcrmanagerhelp_helptext40" }, // similar entries for remaining fields ...
```

```java
        };

public Object[ ][ ] getContents( )
    {
      return contents;
    } static final Object[ ][ ] contents =
    {
      //*****************************
      //
      // LOCALIZE THE FOLLOWING:
      //
      //*****************************

// -------------------------------------------------
      //                    TCRManager
      // -------------------------------------------------

//
      // Menu Subject Headings
      //
      { "tcrmanagerhelp_searchtext10",  "1.0 Introduction" }, { "tcrmanagerhelp_searchtext20",  "2.0 TCRManager Window" },
      { "tcrmanagerhelp_searchtext21",  "   2.1 MenuBar" },
      { "tcrmanagerhelp_searchtext210",  "      2.1.0 Select" },
      { "tcrmanagerhelp_searchtext2100", "         2.1.0.0 Save Directory" },
      { "tcrmanagerhelp_searchtext2101", "         2.1.0.1 Server Information" },
      { "tcrmanagerhelp_searchtext2102", "         2.1.0.2 Quit" },
      { "tcrmanagerhelp_searchtext211",  "      2.1.1 Help" },
      { "tcrmanagerhelp_searchtext2110", "         2.1.1.0 Help Contents" },
      { "tcrmanagerhelp_searchtext22",  "   2.2 Main Window" },
      { "tcrmanagerhelp_searchtext23",  "   2.3 Instructions" },
      { "tcrmanagerhelp_searchtext24",  "   2.4 Buttons" },
      { "tcrmanagerhelp_searchtext240", "      2.4.0 OK" },
      { "tcrmanagerhelp_searchtext25",  "   2.5 Status Line" }, { "tcrmanagerhelp_searchtext30",  "3.0 TCRManagerHelp Window" },
      { "tcrmanagerhelp_searchtext31",  "   3.1 MenuBar" },
      { "tcrmanagerhelp_searchtext310", "      3.1.0 Backward" },
      { "tcrmanagerhelp_searchtext311", "      3.1.1 Forward" },
      { "tcrmanagerhelp_searchtext312", "      3.1.2 Quit" }, { "tcrmanagerhelp_searchtext40",  "4.0 TCRQuery Window" }, // similar entries for remaining choices ...

//
      // 1.0 - TCRManagerHelp Introduction Section.
      //
      { "tcrmanagerhelp_helptext10",
                "\n"
         + " Welcome to the Test Case Repository (TCR) Help Dialog.\n"
         + "\n"
         + " This help dialog is provided to afford the user some help while\n"
         + " using the TCR Manager to filter and perform queries against\n"
         + " the selected TCR DB.\n"
         + "\n"
         + " This application offers the flexibility for users to query a\n"
         + " selected TCR DB while testcase results are still being reported.\n"
         + " Therefore, the user can see the results of their test execution\n"
         + " in real time.  They can even perform multiple queries at once,\n"
         + " enabling them to monitor more than one test execution.\n"
```

```
                    },

//
            // 2.0 - TCRManager Help.
            //
            { "tcrmanagerhelp_helptext20",
                        "\n"
                        + " The TCR Manager main window will display the currently available\n"
                        + " test components for the particular Test Case Repository on the\n"
                        + " selected server.  The user can select a component to query results\n"
                        + " from using the query dialog.  Please see the appropriate help\n"
                        + " for tailoring a query against a component."
            },
            { "tcrmanagerhelp_helptext21",
                        "\n"
                        + " The MenuBar is provided for user to have some way of tailoring\n"
                        + " the current session properties or look and feel.  Please see\n"
                        + " subsections in this help for details on each.\n"
            }, // similar entries, providing associated help text, for other choices ...
            // and some error handling, just in case { "tcrmanagerhelp_rberror", "\n"
                        + " Help Text Missing!  Resource Bundle ERROR!\n"
                        + "\n"
                        + " Please report this tool error to owner.\n"
                        + " The following Resource Bundle entry was NOT found.\n\n"
            }, //*****************************
//
// END OF MATERIAL TO LOCALIZE
//
//*****************************

};

} // end TCRHelp
```

What is claimed is:

1. A method for displaying data for selection by a user, comprising steps of:
   providing a plurality of name pairs, each of the name pairs comprising a name key and an associated name value;
   providing a plurality of string pairs, each of the string pairs comprising a string key and an associated string value;
   providing a plurality of key pairs, each of the key pairs comprising a first key and a second key, each of the first keys pointing to one of the name keys and each of the second keys pointing to one of the string keys, such that the name value associated with the pointed-to name key is thus associated with the sting value associated with the pointed-to string key; and
   accessing the string value associated with a selected name value by using a particular one of the key pairs, wherein the first key in the particular one of the key pairs points to the name key with which the selected name value is associated and the second key in the particular one of the key pairs points to the string key with which the string value to be accessed is associated.

2. The method according to claim 1, wherein the plurality of name pairs and the plurality of string pairs are stored as a resource bundle.

3. The method according to claim 2, wherein the resource bundle is a Java ListResourceBundle.

4. The method according to claim 1, wherein the accessing step further comprises the steps of:
   displaying a user interface having a first interactive panel and a second interactive panel;
   displaying within the first interactive panel, for selection by a user, at least a portion of the name values;
   responsive to selection of the selected name value from the displayed portion, introspecting through the plurality of key pairs to locate the string value to be accessed; and
   displaying the located string value within the second interactive panel of the user interface.

5. The method according to claim 4, wherein the selected name value is displayed as a graphical icon.

6. The method according to claim 4, wherein the selected name value is displayed as a text string.

7. The method according to claim 4, wherein the displayed portion is displayed as an ordered list.

8. The method according to claim 7, wherein the ordered list is an outline.

9. The method according to claim 7, wherein the ordered list is an ordered tree.

10. The method according to claim 4, wherein the located string value is a text string.

11. The method according to claim 1, wherein each of the first keys is identical to its pointed-to name key and each of the second keys is identical to its pointed-to string key.

12. A method for displaying textual help information through a graphical user interface ("GUI") to a user, comprising steps of:
   providing a data structure comprising (i) a first array containing topic pairs, each of the topic pairs comprising a topic key and an associated topic text string and (ii) a second array containing text pairs, each of the text pairs comprising a text key and an associated text string;
   providing a plurality of key pairs, each of the key pairs comprising a first key and a second key, each of the first keys pointing to one of the topic keys and each of the second keys pointing to one of the text keys, such that the topic text string associated with the pointed-to topic key is thus associated with the text string associated with the pointed-to text key;
   displaying through the GUI a window having a first interactive panel and a second interactive panel;
   displaying within the first interactive panel, for selection by the user, at least a portion of the topic text strings;
   responsive to selection of a particular topic text string from the displayed portion, introspecting through the plurality of key pairs to locate the text string associated with the selected topic text string; and
   displaying the located text string within the second interactive panel.

13. The method according to claim 12, wherein the data structure is a Java ListResourceBundle.

14. A computer program product for accessing textual data, the computer program product embodied on one or more computer-readable media and comprising:
   computer-readable program code means for encapsulating a data structure comprising (i) a set of topic pairs, each of the topic pairs comprising a topic key and an associated topic text string and (ii) a set of text pairs, each of the text pairs comprising a text key and an associated text string;
   computer-readable program code means for providing a set of key pairs, each of the key pairs comprising a first key and a second key, each of the first keys pointing to one of the topic keys and each of the second keys pointing to one of the text keys, such that the topic text string associated with the pointed-to topic key is thus associated with the text string associated with the pointed-to text key;
   computer-readable program code means for retrieving the set of key pairs through introspection;
   computer-readable program code means for displaying a user interface having a first interactive panel and a second interactive panel;
   computer-readable program code means for displaying within the first interactive panel, for selection by a user, at least a portion of the topic text strings;
   computer-readable program code means, responsive to selection of a particular one of the displayed topic text strings by the user, for locating the text string associated therewith using the retrieved set of key pairs; and
   computer-readable program code means for displaying the located text string within the second interactive panel.

15. The computer program product according to claim 14, wherein the data structure is a Java ListResourceBundle.

16. A system for displaying data for selection by a user, comprising:
   means for providing a data structure comprising (i) a set of topic pairs, each of the topic pairs comprising a topic key and an associated topic text string and (ii) a set of text pairs, each of the text pairs comprising a text key and an associated text string;
   means for providing a set of key pairs, each of the key pairs comprising a first key and a second key, each of the first keys pointing to one of the topic keys and each of the second keys pointing to one of the text keys, such that the topic text string associated with the pointed-to topic key is thus associated with the text string associated with the pointed-to text key;

means for displaying a user interface having a first interactive panel and a second interactive panel;

means for displaying within the first interactive panel, for selection by a user, at least a portion of the topic text strings;

responsive to selection of a particular one of the displayed topic text strings by the user, means for introspecting through the set of key pairs to locate the text string associated therewith; and means for displaying the located text string within the second interactive panel.

17. The system according to claim 16, wherein the selected particular one is displayed as a graphical icon.

18. The system according to claim 16, wherein the selected particular one is displayed as a text string.

19. The system according to claim 16, wherein the displayed portion is displayed as one of (1) an ordered list or (2) an ordered tree.

20. The system according to claim 19, wherein the ordered list is an outline.

21. The system according to claim 16, wherein the located text string is a help text string.

22. The system according to claim 16, wherein the data structure is a Java ListResourceBundle.

* * * * *

UNITED STATES PATENT AND TRADEMARK OFFICE
CERTIFICATE OF CORRECTION

| | |
|---|---|
| PATENT NO. | : 7,069,509 B2 |
| APPLICATION NO. | : 10/052579 |
| DATED | : June 27, 2006 |
| INVENTOR(S) | : Griffin |

It is certified that error appears in the above-identified patent and that said Letters Patent is hereby corrected as shown below:

Column 7,
Line 1, change "strings arid a" to -- strings and a --;

Column 8,
Line 25, change "$alt_{13}$ rb" to -- alt_rb --;

Column 37,
Line 14, change "the sting value" to -- the string value --.

Signed and Sealed this

Tenth Day of October, 2006

JON W. DUDAS
*Director of the United States Patent and Trademark Office*